June 11, 1963  M. MARSHALL ETAL  3,092,871
APPARATUS FOR HOLDING CATTLE IN POSITION FOR HUMANE SLAUGHTERING
Filed May 21, 1962  4 Sheets-Sheet 1
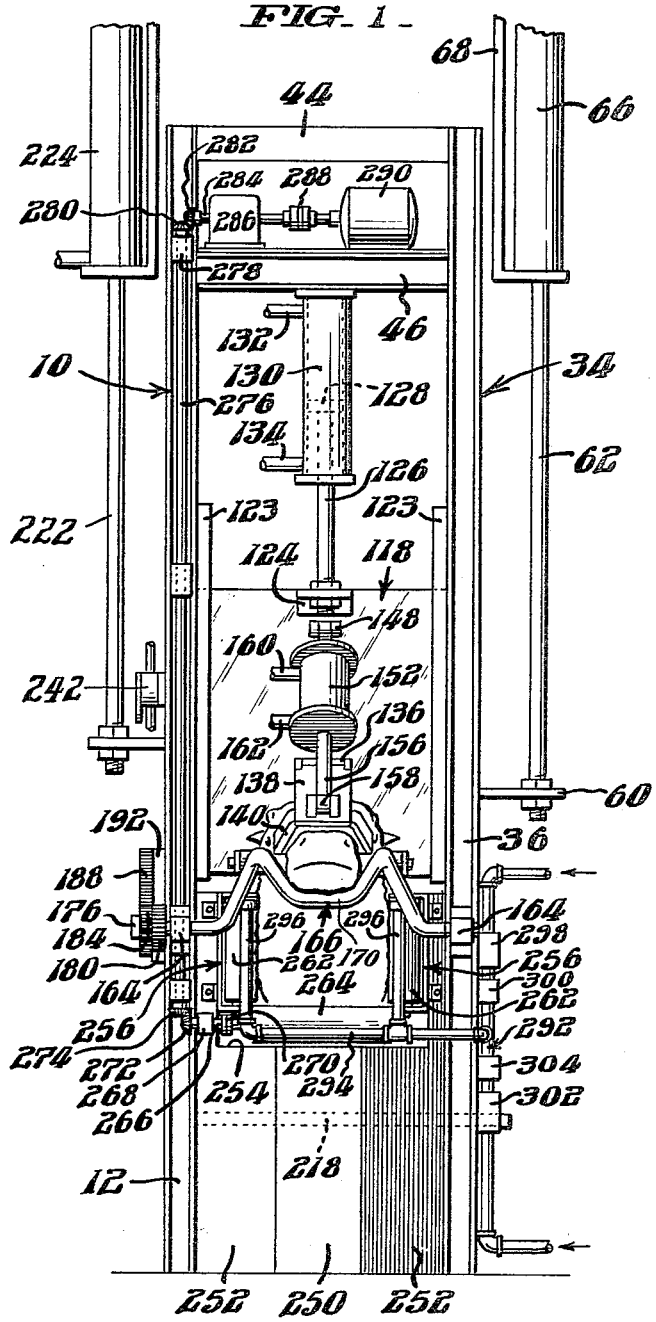
INVENTORS.
Milton Marshall, Elwood E. Milbury &
BY Eugene W. Shultz,
Paul & Paul
ATTORNEYS.

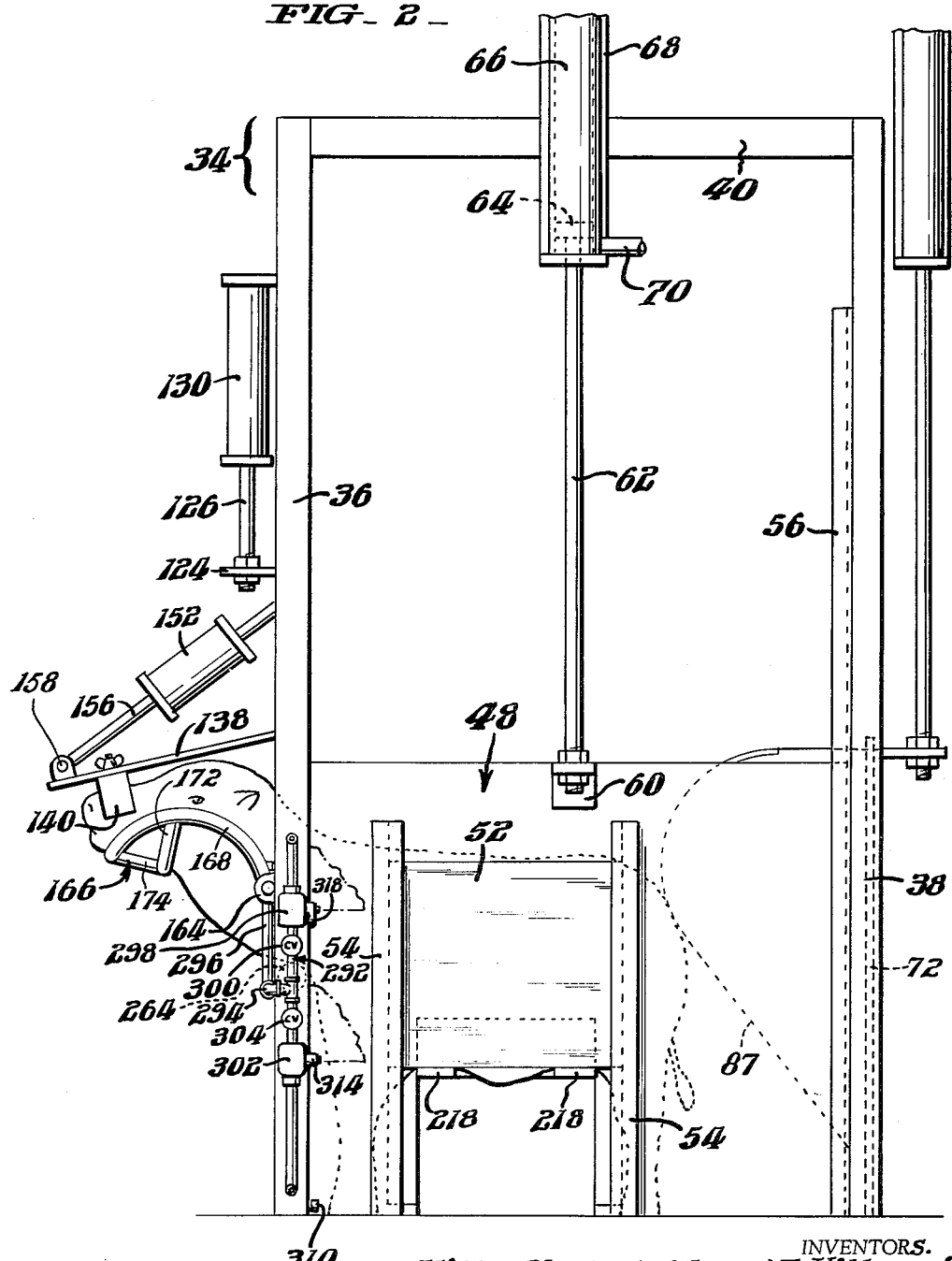

June 11, 1963  M. MARSHALL ETAL  3,092,871
APPARATUS FOR HOLDING CATTLE IN POSITION FOR HUMANE SLAUGHTERING
Filed May 21, 1962  4 Sheets-Sheet 3
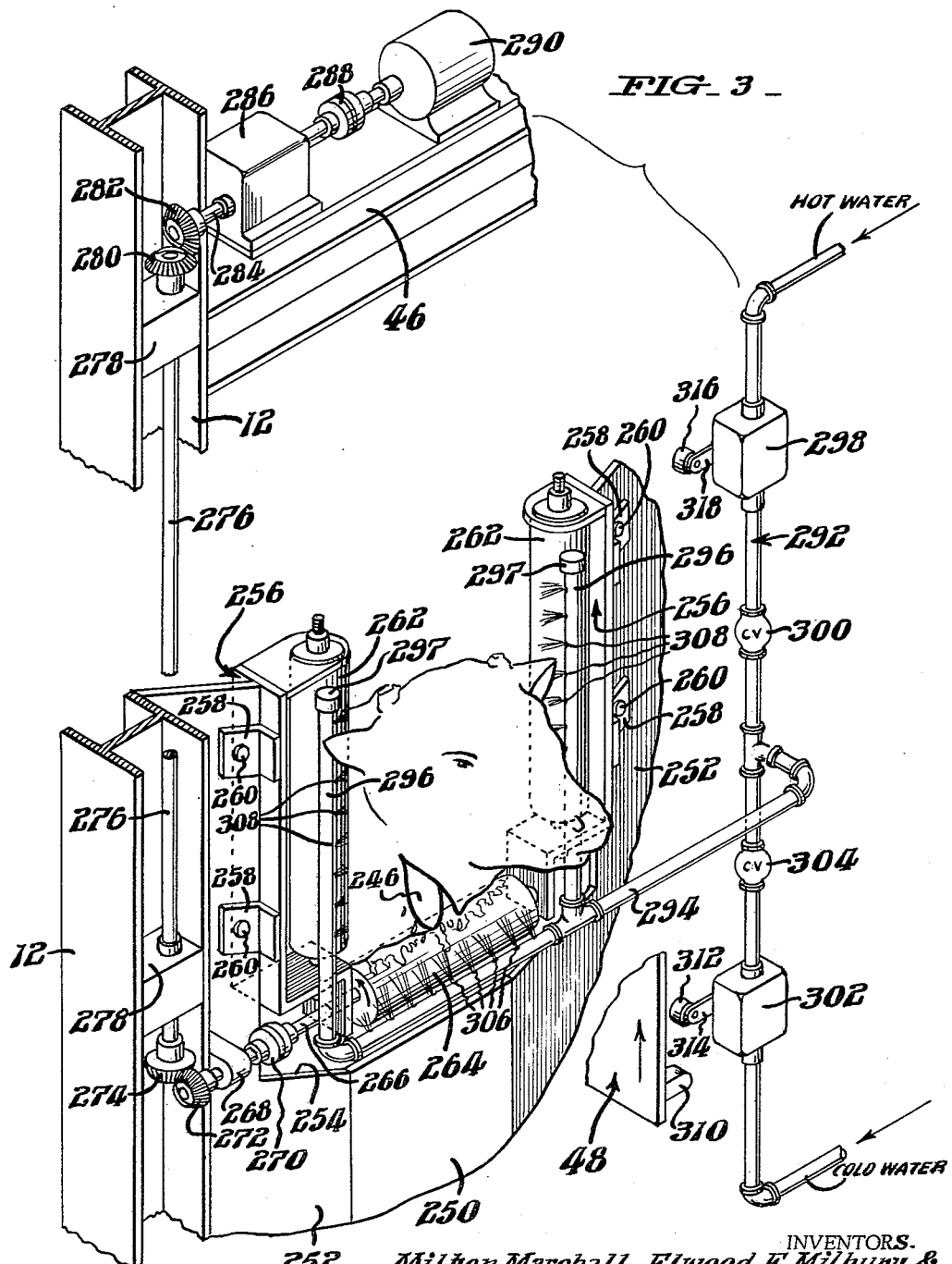
FIG_3_
INVENTORS.
Milton Marshall, Elwood E. Milbury &
BY Eugene W. Shultz,
Paul & Paul
ATTORNEYS.

June 11, 1963   M. MARSHALL ETAL   3,092,871
APPARATUS FOR HOLDING CATTLE IN POSITION FOR HUMANE SLAUGHTERING
Filed May 21, 1962   4 Sheets-Sheet 4
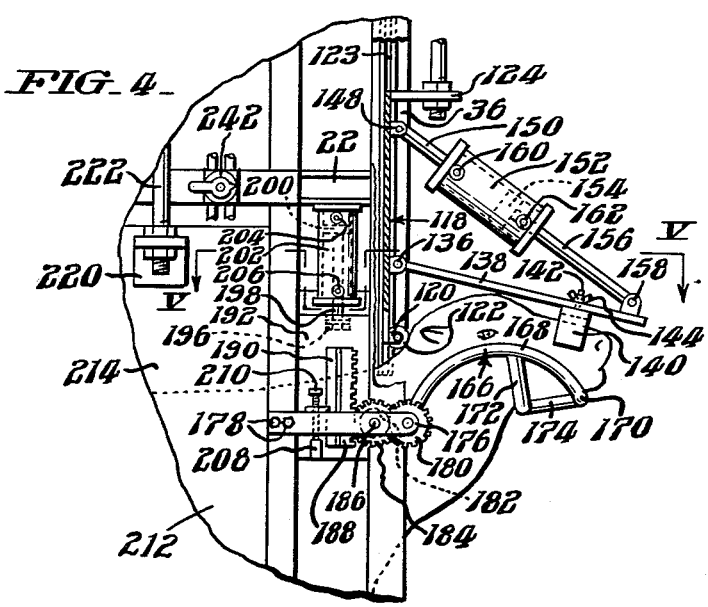
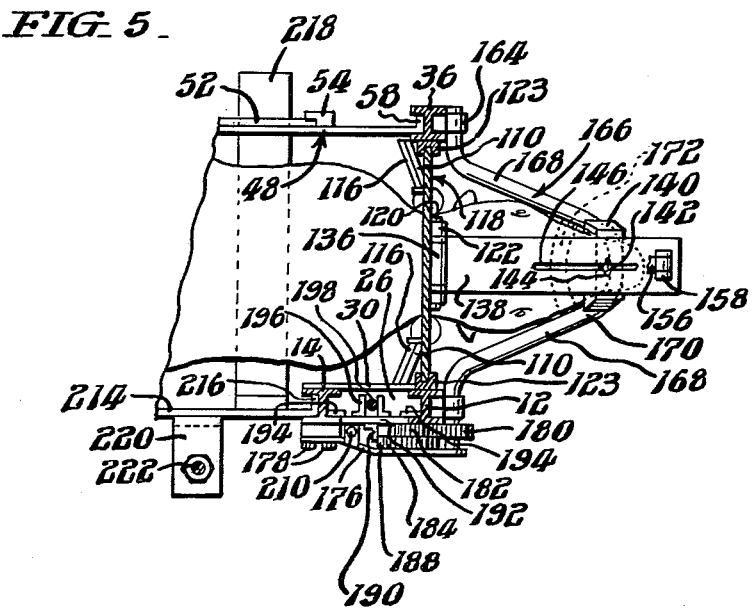
INVENTORS.
Milton Marshall, Elwood E. Milbury
& Eugene W. Schultz,
BY Paul & Paul
ATTORNEYS.

United States Patent Office 3,092,871
Patented June 11, 1963

3,092,871
APPARATUS FOR HOLDING CATTLE IN POSITION FOR HUMANE SLAUGHTERING
Milton Marshall, Oreland, Pa., Elwood E. Milbury, Collingswood, N.J., and Eugene W. Shultz, Philadelphia, Pa., assignors, by mesne assignments, to Humane Slaughtering Device Corporation, Philadelphia, Pa., a corporation of Pennsylvania
Filed May 21, 1962, Ser. No. 196,379
8 Claims. (Cl. 17—1)

This invention relates generally to apparatus for slaughtering animals and particularly to apparatus for penning in and positioning cattle to facilitate slaughtering thereof.

This application is a continuation-in-part of our copending application Serial No. 133,372, filed August 23, 1961.

An important object of the invention is to provide improved apparatus for positioning an animal on all four feet with head erect and throat exposed for being cut.

Another object of the invention is to provide such apparatus with means for preventing damage to the head of the animal when the animal enters and is removed from the pen and for reducing to a minimum the possibility of conataminating the cut open throat of the animal when the animal is removed from the pen.

Other objects of the invention will become apparent when the following description is read with reference to the accompanying drawings, in which:

FIGURE 1 is a front elevation of the pen showing an animal penned in and positioned for being slaughtered;

FIGURE 2 is an elevation of one side of the pen shown in FIGURE 1;

FIGURE 3 is a fragmentary perspective view on an enlarged scale looking at the front of the pen, with parts omitted for the sake of clarity;

FIGURE 4 is a fragmentary elevation of the other side of the pen shown in FIGURE 1; and FIGURE 5 is a section on line V—V of FIGURE 4.

Referring particularly to FIGURE 2, an exemplary pen constructed in accordance with the invention is provided with a rigid side frame, generally designated 34, including a pair of column members 36 and 38, the upper end portions of which are tied together by a beam member 40. Affixed to column member 38 is a guide member 56, and disposed between column member 36 and guide member 56 is a vertically slidable side gate 48. Carried by the gate 48 are a pair of laterally spaced guide members 54 which accommodate a slide 52 over an opening in the gate 48. Affixed to the gate 48 is a bracket 60 to which is connected the lower end portion of an upright rod 62. The upper end portion of rod 62 mounts a piston 64 which works in a cylinder 66. The cylinder is mounted upon a bracket 68 carried by beam member 40. A conduit 70 is connected to the lower end of the cylinder.

Referring particularly to FIGURES 1, 4 and 5, on the opposite side of the pen is a rigid side frame, generally indicated 10, including column members 12 and 14. Tying the upper end portions of column members 12 and 36 together are vertically spaced tie members 44 and 46. Affixed respectively to the column members 12 and 36 are a pair of guide members 123 which slidably receive a yoke member 118. Mounted upon the yoke member is a pivot 136, and extending from the pivot is a plate 138. Depending from the free end of plate 138 is a nose piece 140. Mounted upon the free end of plate 138 is a pivot 158 to which is connected one end of a rod 156. The opposite end of the rod mounts a piston (not shown) working in a cylinder 152. The upper end of the cylinder is pivoted, as at 148, to the yoke 118. Connected to the cylinder are a pair of conduits 160 and 162. Affixed to the yoke 118 is a bracket 124 to which is connected the lower end portion of an upright rod 126. The upper end portion of the rod mounts a piston 128 working in a cylinder 130, which depends from the tie member 46. Connected into the cylinder 130 are a pair of conduits 132 and 134.

Affixed to the columns 12 and 36 respectively are a pair of bearings 164, which receive respectively opposite end portions of a chin bar, generally designated 166. The chin bar is bent to provide opposite side curved portions 168 connected by an intermediate curved portion 170. Affixed to the bar 166 are a curved auxiliary bar 172 and straight auxiliary bars 174. The curved intermediate chin bar portion 170 and the auxiliary bars 172 and 174 conjointly form a chin rest. One end of the chin bar 166 extends freely through one end of a horizontally extending strap 176. The opposite end of the strap is affixed, as at 178, to the column 14. Affixed to the chin bar 166 is a gear 180 which meshes with a gear 182 affixed to a gear 184. The gears 182 and 184 are mounted upon a pintle 186 affixed by one end to the strap 176. Meshing with the gear 184 is a vertically extending rack 188 mounted by a bracket 190 upon a slide 192, which is guided by members 194 affixed respectively to columns 12 and 14. Affixed to the slide 192 is a bracket 196, which has connected thereto the lower end portion of a rod 198 extending upwardly to a piston 200 working in a cylinder 202 depending from the tie member 22. Connected to opposite ends respectively of the cylinder 202 are a pair of fluid pressure conduits 204 and 206. Mounted upon the slide 192 is a lug 208 aligned with an adjustable stop 210 carried by the strap 176.

Slidably fitted between the columns 18 and 38 is an end gate 72, and mounted on the gate 72 is a bumper 87.

The apparatus, as thus far described, is identical with that disclosed in our copending application, Serial No. 133,372, filed August 23, 1961, to which reference may be had for a more detailed description.

The front wall of the pen comprises a central panel 250 terminating on opposite sides thereof in two rearwardly diverging panels 252 affixed respectively to the column members 12 and 36. The upper end portion of the front wall is provided with a cutout designated 254. On each side of the cutout is a bracket, generally designated 256 secured to the associated panel 252 by brackets 258 and bolts 260. Journalled in each bracket is a vertically disposed freely revolvable roller 262. Disposed between the brackets 256 is a horizontally disposed roller 264 affixed to a shaft 266 journalled respectively in the brackets 256. One end portion of the shaft 266 extends through a bearing 268 carried by column member 12. Connected in the shaft 266 is a slip clutch 270. A terminal portion of the shaft 266 mounts a bevel gear 272, which meshes with a bevel gear 274 on the end of an upright shaft 276 journalled in a pair of brackets 278. The upper end portion of the shaft 276 is fitted with a bevel gear 280 which meshes with a bevel gear 282 carried by a shaft 284 extending from a speed reducer 286 which is coupled, as at 288, to an electric motor 290. Speed reducer 286 and electric motor 290 are mounted upon the tie member 46.

Extending vertically in front of the pen is a water line, generally designated 292, which has a horizontally extending branch 294 from which extend two sub-branches 296 capped, as at 297. In water line 292 is connected a hot water valve 298 and a check valve 300. Also connected in water line 292 is a cold water valve 302 and a check valve 304. The branch 294 is provided with a series of longitudinally spaced openings 306, and the sub-branches 296 are provided with a series of longitudinally spaced openings 308. Mounted upon the lower left-hand corner of the gate 48 (as viewed in FIGURE 2) is a lug 310 which is arranged to engage with a roller 312 carried by an arm 314 which controls cold water valve 302 and with a roller 316 carried by an arm 318 which controls hot water valve 298.

In the operation of the apparatus, the animal is driven into the pen and forced to project its head through the opening between the rollers 262 and over the roller 264, as shown in FIGURE 3, whereupon the pen is closed. Now a valve (not shown) is operated to supply fluid pressure to the cylinder 130 to extend the rod 126, whereupon the yoke member 118 is lowered to position the collar 120 about four inches above the neck of the animal.

Now another valve (not shown) is operated to supply fluid pressure to cylinder 202 to retract rod 198, slide 192 and rack 188, whereupon, through the gears 184, 182, and 180, the chin bar 166 is raised. As the bar swings upwardly and forwardly, it catches the animal under the chin and raises its neck to the collar 120, exposing the throat of the animal for being cut. Movement of the chin bar is limited by engagement of the lug 208 with the adjustable stop 210.

Now tines 218 are raised to the underbelly of the animal, and the nose piece 140 is lowered. Another valve (not shown) is operated to supply fluid pressure to the cylinder 224 to retract the rod 222, in consequence of which fork 212 is raised so that the tines 218 engage the underbelly of the animal, as in FIGURES 1 and 2. As the fork is elevated, the tines 218 raise the slide 52.

Now valve 242 is operated to supply fluid pressure to cylinder 152 to extend rod 156, whereupon the plate 138 is lowered and the piece 140 carried thereby engages with the nose of the animal.

The animal, thus restrained against movement, is ready to be slaughtered. Accordingly, its throat is cut, as at 246, and it slumps onto tines 218. The slide gate 48 may then be raised a short distance to allow the operator to reach under the gate and shackle one leg of the animal. After the shackling operation, the side gate 48 is raised all the way, whereupon fluid pressure is supplied to cylinder 202 to again extend rod 198, slide 192 and rack 188. Thus gears 184, 182, and 180 are turned and chin bar 166 is relowered to its initial position. Then the yoke member 118 raised, and the shackled animal is hoisted directly from tines 218 and moved from the pen through the opening in the side thereof. After the pen has been thoroughly cleaned, the tines and side gate 48 are relowered. Thus the pen is ready for the next animal.

Operation of the apparatus, as thus far described, is essentially the same as in the case of the apparatus of our copending application, mentioned hereinbefore, to which reference may be had for a more detailed description.

With the gate 48 fully lowered, cold water valve 302 is open and hot water valve 298 is closed. Thus cold water is sprayed upon rollers 262 and 264 through openings 306 and 308. When the gate 48 is raised about one-third of the way, lug 310 engages roller 312 and raises arm 314, whereupon valve 302 is closed. The valve remains closed after the lug 310 passes by the roller 312. When the gate 48 is raised approximately two-thirds of the way, lug 310 engages roller 316 and raises arm 318, whereupon hot water valve 298 opens and hot water is sprayed upon the rollers 262 and 264. The valve remains open after the lug 310 passes by the roller 316. When the gate is relowered approximately one-third of the way, the lug 310 recloses the valve 298, whereupon the hot water spray is terminated. When the gate is relowered approximately two-thirds of the way, the lug 310 reopens the valve 302, whereupon the rollers are again sprayed with cold water. It will be noted that both hot and cold water may flow into the section of the line 292 between the check valves 300 and 304, but may flow out of said section only through the branch 294.

Rollers 262 and 264 prevent injury to the hide of the animal as its neck is forced between rollers 262 or withdrawn from between the same. Roller 264 is positively rotated at about 17 r.p.m. so that the hot and cold water sprays keep its entire surface clean. Thus when the cut open throat of the animal is dragged over the roller 264, it comes into contact with this clean surface, and the possibility of the open wound being contaminated is reduced to a minimum.

The slip clutch 270 is provided for terminating rotation of the roller 264 when the load thereon is such that rotation of the roller might cause injury to the hide.

It will be understood, of course, that the present invention, as described and shown, is susceptible to various changes and modifications which may be made without any departure from the general principles or real spirit of the invention. Accordingly, it is intended to claim the present invention broadly, as well as specifically, as indicated in the appended claims.

Having thus described our invention, we claim as follows:

1. Apparatus for holding cattle and like animals to facilitate slaughtering thereof comprising means providing an enclosure for receiving an animal and holding it with its head and neck extending out of said enclosure to facilitate the operation of cutting its throat, roller means disposed for underlying the neck of the animal when the latter is held as aforesaid, means for actuating said roller means, and means proximate said roller means for spraying the same with a fluid to keep it clean so that the cut open throat of the animal, when dragged across said roller means during the operation of removing the slaughtered animal from the enclosure, is not contaminated.

2. Apparatus for holding cattle and like animals to facilitate slaughtering thereof comprising means providing an enclosure for receiving an animal and holding it with its head and neck extending out of said enclosure to facilitate the operation of cutting its throat, roller means disposed for underlying the neck of the animal when the latter is held as aforesaid, means for actuating said roller means, valved means proximate said roller means for spraying the same with a fluid to keep it clean so that the cut open throat of the animal, when dragged across said roller means during the operation of removing the slaughtered animal from the enclosure, is not contaminated, and means for operating said valved means thereby to automatically control said spraying.

3. Apparatus for holding cattle and like animals to facilitate slaughtering thereof comprising means providing an enclosure for receiving an animal and holding it with its head and neck extending out of said enclosure to facilitate the operation of cutting its throat, a gate through which the slaughtered animal may be removed from said enclosure, roller means disposed for underlying the neck of the animal when the latter is held as aforesaid, means for actuating said roller means, valved means proximate said roller means for spraying the same with a fluid to keep it clean so that the cut open throat of the animal, when dragged across said roller means during the operation of removing the slaughtered animal from the enclosure, is not contaminated, and means operated by said gate for controlling said valved means thereby to automatically control said spraying.

4. Apparatus for holding cattle and like animals to facilitate slaughtering thereof comprising means providing an enclosure for receiving an animal and holding it with its head and neck extending out of said enclosure to facilitate the operation of cutting its throat, a gate through which the slaughtered animal may be removed from said enclosure, roller means disposed for underlying the neck of the animal when the latter is held as aforesaid, means for actuating said roller means, and means proximate said roller means for spraying the same selectively with hot and cold water to keep it clean so that the cut open throat of the animal, when dragged across said roller means during the operation of removing the slaughtered animal from the enclosure, is not contaminated, including hot and cold water supply valves operated in predetermined timed relation to opening and closing movements of said gate.

5. Apparatus for holding cattle and like animals to facilitate slaughtering thereof comprising means providing an enclosure for receiving an animal and holding it with its head raised and its head and neck extending out of said enclosure to facilitate the operation of cutting its throat, roller means disposed for underlying the neck of the animal when the latter is held as aforesaid, separate roller means disposed for being positioned respectively upon opposite sides of the neck of the animal when the latter is held as aforesaid, means for positively actuating the roller means disposed for underlying the neck of the animal, and means proximate both of said roller means for spraying the same with a fluid to keep them clean so that the cut open throat of the animal, when dragged across the roller means disposed for underlying the neck of the animal during the operation of removing the slaughtered animal from the enclosure, is not contaminated.

6. Apparatus for holding cattle and like animals to facilitate slaughtering thereof comprising means providing an enclosure for receiving an animal and holding it with its head raised and its head and neck extending out of said enclosure to facilitate the operation of cutting its throat, roller means disposed for underlying the neck of the animal when the latter is held as aforesaid, means for actuating said roller means including means for automatically terminating movement of said roller means when the required turning effort exceeds a predetermined amount, and means proximate said roller means for spraying the same with a fluid to keep it clean so that the cut open throat of the animal, when dragged across said roller means during the operation of removing the slaughtered animal from the enclosure is not contaminated.

7. Apparatus for holding cattle and like animals to facilitate slaughtering thereof comprising means providing an enclosure for penning in an animal on all sides thereby to restrain the animal from movement fore and aft and to either side including means in a side of said enclosure operable to afford an opening through which the animal may be removed bodily from said enclosure after it is slaughtered, means extending horizontally from side to side of said enclosure and operable for engaging with the underbelly of the animal to force the animal, before it is slaughtered, to stand upright in said enclosure on all four feet with its head and neck extending out of said enclosure and to support the body of the animal, after it is slaughtered, to keep it from falling to the floor of the enclosure, and means operable for engaging the animal under the chin and raising and holding its head in a predetermined position to expose its neck for being cut.

8. Apparatus for holding cattle and like animals to facilitate slaughtering thereof comprising means providing an enclosure for penning in an animal on all sides thereby to restrain the animal from movement fore and aft and to either side including means in a side of said enclosure operable to afford an opening through which the animal may be removed bodily from said enclosure after it is slaughtered, means extending horizontally from side to side of said enclosure and operable for engaging with the underbelly of the animal to force the animal, before it is slaughtered, to stand upright in said enclosure on all four feet with its head and neck extending out of said enclosure and to support the body of the animal, after it is slaughtered, to keep it from falling to the floor of the enclosure, a bar adapted to extend under the animal's chin and rearwardly on opposite sides of the animal's head thereby to form a chin rest therefor, means mounting said chin bar upon said enclosure for rocking movement about a horizontal axis, and means for actuating said chin bar for engaging the animal under the chin and raising and holding its head in a predetermined position to expose its neck for being cut.

References Cited in the file of this patent
UNITED STATES PATENTS

| | | |
|---|---|---|
| 1,197,215 | Lake | Sept. 5, 1916 |
| 1,487,935 | Gray | Mar. 25, 1924 |

FOREIGN PATENTS

| | | |
|---|---|---|
| 14,348 | Great Britain | 1915 |